(12) United States Patent
Falempin et al.

(10) Patent No.: US 10,826,700 B2
(45) Date of Patent: Nov. 3, 2020

(54) DYNAMIC DATA ENCRYPTION METHOD, AND ASSOCIATED METHOD FOR CONTROLLING DECRYPTION RIGHTS

(71) Applicant: CITYPASSENGER, Les Ulis (FR)

(72) Inventors: Sven Falempin, Les Ulis (FR); Bruno Duval, Les Ulis (FR)

(73) Assignee: CITYPASSENGER, Les Ulis (FR)

( * ) Notice: Subject to any disclaimer, the term of this patent is extended or adjusted under 35 U.S.C. 154(b) by 470 days.

(21) Appl. No.: 15/533,985

(22) PCT Filed: Dec. 8, 2015

(86) PCT No.: PCT/EP2015/079015
§ 371 (c)(1),
(2) Date: Sep. 12, 2017

(87) PCT Pub. No.: WO2016/091898
PCT Pub. Date: Jun. 16, 2016

(65) Prior Publication Data
US 2018/0115422 A1    Apr. 26, 2018

(30) Foreign Application Priority Data

Dec. 8, 2014  (FR) ........................................ 14 62042
Dec. 8, 2014  (FR) ........................................ 14 62056

(51) Int. Cl.
*H04L 9/32*     (2006.01)
*H04L 29/06*    (2006.01)
(Continued)

(52) U.S. Cl.
CPC .......... *H04L 9/3226* (2013.01); *G06F 21/602* (2013.01); *H04L 9/088* (2013.01);
(Continued)

(58) Field of Classification Search
CPC ......... H04L 9/08; H04L 9/0861; H04L 9/088; H04L 9/0894; H04L 9/14; H04L 9/30;
(Continued)

(56) References Cited

U.S. PATENT DOCUMENTS

| 7,933,410 B2 * | 4/2011 | Fahrny | H04N 21/4623 |
| | | | 380/201 |
| 2002/0083178 A1 * | 6/2002 | Brothers | G06F 21/10 |
| | | | 709/226 |

(Continued)

FOREIGN PATENT DOCUMENTS

WO   WO-2008084154 A2 *  7/2008  ............. G06F 21/10

*Primary Examiner* — Jayesh M Jhaveri
(74) *Attorney, Agent, or Firm* — Womble Bond Dickinson (US) LLP

(57) ABSTRACT

An encryption method implemented by a terminal having an operating system that can be accessed by several users and an encryption module for encrypting data intended for another terminal. The method includes a detection step for detecting when a session for accessing the operating system is opened by a user. In response to the detection of such a session being opened, the method continues with a step of setting the parameters of the encryption module with an encryption key unique to the user for encrypting data intended for another terminal, in which the encryption key is generated by the terminal, or is stored in a memory of the terminal before the detection of a session accessing the operating system being opened.

17 Claims, 4 Drawing Sheets

(51) Int. Cl.
*H04L 9/08* (2006.01)
*G06F 21/60* (2013.01)
*H04L 9/14* (2006.01)
*G06F 21/62* (2013.01)

(52) U.S. Cl.
CPC .......... *H04L 9/0861* (2013.01); *H04L 9/0894* (2013.01); *H04L 9/14* (2013.01); *H04L 63/0442* (2013.01); *G06F 21/62* (2013.01); *G06F 2221/2107* (2013.01)

(58) Field of Classification Search
CPC ... H04L 63/0428; H04L 63/0442; H04L 9/32; H04L 29/06; G06F 21/60; G06F 21/62
See application file for complete search history.

(56) References Cited

U.S. PATENT DOCUMENTS

| | | | | |
|---|---|---|---|---|
| 2010/0017624 A1* | 1/2010 | Chan | ..................... | G06F 21/125 |
| | | | | 713/190 |
| 2014/0244998 A1* | 8/2014 | Amenedo | ............. | H04L 63/062 |
| | | | | 713/156 |
| 2015/0134962 A1* | 5/2015 | Mahajan | ............... | H04L 63/061 |
| | | | | 713/171 |
| 2017/0046532 A1* | 2/2017 | Miller | ..................... | H04L 9/006 |
| 2018/0095812 A1* | 4/2018 | Deutsch | ................ | G06F 11/073 |

\* cited by examiner

DYNAMIC DATA ENCRYPTION METHOD, AND ASSOCIATED METHOD FOR CONTROLLING DECRYPTION RIGHTS

GENERAL FIELD

The invention relates to the field of encryption of data intended to transit in a network.

The invention relates to an encryption method of data intended to transit in a network.

PRIOR ART

Asymmetrical encryption is a well-known technique for encrypting data transiting in a network in which several user terminals communicate.

Conventionally, a first terminal encrypts data with a public key of the recipient, and a second terminal decrypts the encrypted data by means of a private key and verifies a signature of the sender with his public key.

However, a hacker can try to guess the public key used by the first terminal, for example by intercepting the encrypted data.

Document U.S. Pat. No. 5,237,614 describes the encryption of files and folders by a terminal using an encryption key unique to a user of the terminal. However, this encryption key is transmitted by an authentication server to the terminal during use of the terminal by the user. The encryption key can now be intercepted by a hacker when being sent from the server to the terminal and can usurp the identity of the user by use of the intercepted key.

PRESENTATION OF THE INVENTION

An aim of the invention is to perform encryption of data before they are sent to a network, which is more difficult to "hack" by a person capable of intercepting the encrypted data in the network.

To achieve this aim the invention proposes an encryption method executed by a terminal comprising an operating system accessible by several users and a data encryption module for another terminal, the method comprising steps of:
  detection of opening an access session to the operating system by a user,
  in response to the detection of opening, parameterising of the encryption module with an encryption key unique to the user to encrypt data for another terminal.

As the encryption key used is unique to the user, any new access to the operating system by a new user causes a change in parameterising of the encryption module. In this way, it becomes more difficult for a hacker to decrypt the data sent by the terminal since the latter simply does not know who the current user of the terminal is, and therefore which encryption key is the key used at an instant t to encrypt the data.

Also, as the encryption key is present in the memory of the terminal prior to detection or this key is generated by the terminal, this encryption key has no need to be communicated to a remote server as proposed in the documents of the prior art cited in the introduction. It is therefore not possible for a hacker to usurp the identity of the user by using his key, after having retrieved it, since this key does not transit over the network.

The encryption method according to the invention can also be completed by the following characteristics, taken singly or in any of their technically possible combinations.

The method can also comprise the steps of:
  detection of closing of the access session to the operating system by the user,
  configuration of the encryption module by means of a dummy key in response to the detection of closing.

The detection can comprise a subscription to a signal defined by the operating system, the signal being representative of an opening or closing of access session, and an interception of the signal.

Because the steps of the method are performed for a session of current access by the user and a following access session by the user, the encryption key with which the encryption module is parameterised during the following access session can be selected as different to the encryption key with which the encryption module is parameterised during the current access session.

The method can also comprise the following steps:
  generation of a decryption key adapted to decrypt useful data encrypted by means of the encryption key,
  sending of the decryption key to a control server,
  sending, to the control server, of indicative information for opening and closing an access session to the operating system by the user, the control server being adapted to control the use of the decryption key by another user as a function of the last indicative information sent.

Each key can be generated by the encryption module.

The encryption module can be integrated into a network card independent of the operating system.

The encryption module can encrypt the useful data of grids according to the standard IEEE 802 LAN by means of the encryption key.

The invention also relates to a method for decryption of data previously encrypted by means of the preceding encryption method.

The invention also relates to a computer program product comprising code instructions for the execution of the steps of the proposed encryption or decryption method, when this program product is executed by a terminal.

The invention also relates to an encryption kit comprising:
  an encryption module adapted to encrypt data by means of an encryption key, and
  a computer program product according to the preceding claim adapted to configure the encryption key used by the encryption module.

This kit can comprise a network card, the network card integrating the encryption module.

The invention also relates to a method for controlling decryption rights of data comprising the following steps conducted by a control server:
  receipt of a decryption key adapted to decrypt encrypted data by means of an encryption key unique to a user,
  receipt of information indicating an opening and/or closing of access by the user to the operating system of a first terminal,
  receipt of a request sent by a second terminal, the request asking for a decryption key to decrypt encrypted data originating from the first terminal,
  sending of the decryption key to the second terminal in response to the request, as a function of the most recent information received from the first terminal.

The method for controlling decryption rights can comprise the following optional characteristics.
  the decryption key is sent to the second terminal if the most recent information received indicates an opening of access by the user, the decryption key is not sent to the second terminal if the most recent information received indicates a closing of access by the user;

the receipt of an address identifying the first terminal, the receipt of an address identifying the second terminal, in which the decryption key is sent to the second terminal as a function of the two addresses;

the receipt of an identifier of the user of the first terminal, the receipt of an identifier of a user of the second terminal, in which the decryption key is sent to the second terminal as a function of the two identifiers.

The invention also relates to a control server for decryption rights comprising:

a memory adapted to store a decryption key, the decryption key being adapted to decrypt data encrypted by means of an encryption key unique to a user, a network interface adapted to receive:

information indicating an opening of access by the user to the operating system of a first terminal, receiving a request sent by a second terminal, the request asking for a decryption key to decrypt encrypted data originating from the first terminal, and a control unit adapted to control the sending of the decryption key to the second terminal via the network interface in response to the request, as a function of the information received.

DESCRIPTION OF FIGURES

Other characteristics, aims and advantages of the invention will emerge from the following description which is purely illustrative and non-limiting and which must be viewed in conjunction with the attached diagrams, in which.

Similar elements bear identical reference numerals in all figures.

DETAILED DESCRIPTION OF THE INVENTION

Figure 1:
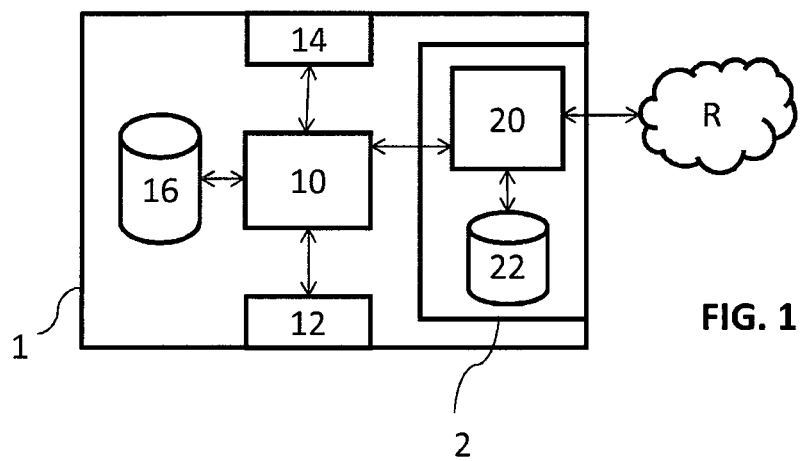
FIG. 1 schematically illustrates a terminal according to an embodiment of the invention.

In reference to FIG. 1, a terminal 1 comprises a data-processing unit 10, input means 12, a display monitor 14, a memory 16, and a network interface 2.

In the present document, a terminal is defined as an equipment intended to be used by a user.

The data-processing unit 10 is adapted to execute a program of the operating system type, stored by the memory 16.

The data-processing unit 10 is also configured to control the display on the display monitor 14 of graphic data of the operating system. The data-processing unit is also configured to process data input by a user of the terminal 1 via the input means 12.

The input means 12 comprise for example a mouse, a keyboard, a tactile interface, etc. The memory 16 can be a memory of hard drive type, SSD, optionally in the form of a removable USB key.

The terminal 1 can be in different forms: desktop computer, portable computer, touchpad, mobile telephone of "smartphone" type, etc.

The operating system executed by the data-processing unit 10 is configured to be utilisable by several users.

The operating system is configured to access private data of each user, these private data being stored in the memory 16.

The operating system is configured to be used by a single user at any one time. As a variant, the operating system can be used by several users at the same time.

Irrespective of the number of users who can simultaneously use the operating system, it is assumed hereinbelow that the operating system is configured such that a user of the operating system cannot access the private data of another user.

The operating system comprises a networking stack adapted to interact with the network card 2.

The terminal 2 also comprises a computer program of application type adapted to interact with the operating system. This application program can for example be installed in the terminal 1 independently of the installation of the operating system.

This application program is configured to communicate with the encryption module embedded in the network card 2.

The application program is configured to execute when the operating system boots up, after the terminal 1 is powered up.

The application program is also configured to detect the opening of an access session to the operating system by a user, and the closing of such a session.

By way of example, if the operating system is of GNU/Linux type, the application program can be a daemon. If the operating system is of Windows® type, the application program can be a "service" in terms of Windows® architecture.

Also, the network interface 2 is in the form of a removable network card connectable to a motherboard (not shown) of the terminal 1.

The network interface 2 has a single MAC address in the network R.

The network interface 2 comprises an encryption module 20 and an internal memory 22.

The encryption module 20 is adapted to apply an encryption to useful data originating from the data-processing unit 10 and send them over the network R, by means of an encryption program.

In other terms, any datum intended to be sent over a network by the terminal can be encrypted by the encryption module 20.

The encryption module 20 is also adapted to apply a decryption to encrypted data received from the network R via a decryption program, and transmit the decrypted data to the data-processing unit 10.

The encryption module 20 is also configured for reading and writing access to the internal memory 22 of the network card 2.

In a particular non-limiting embodiment to be taken as an example hereinbelow, the useful data forming the object of an encryption are useful data (payload) of grids according to standard IEEE 802 LAN.

Figure 2:
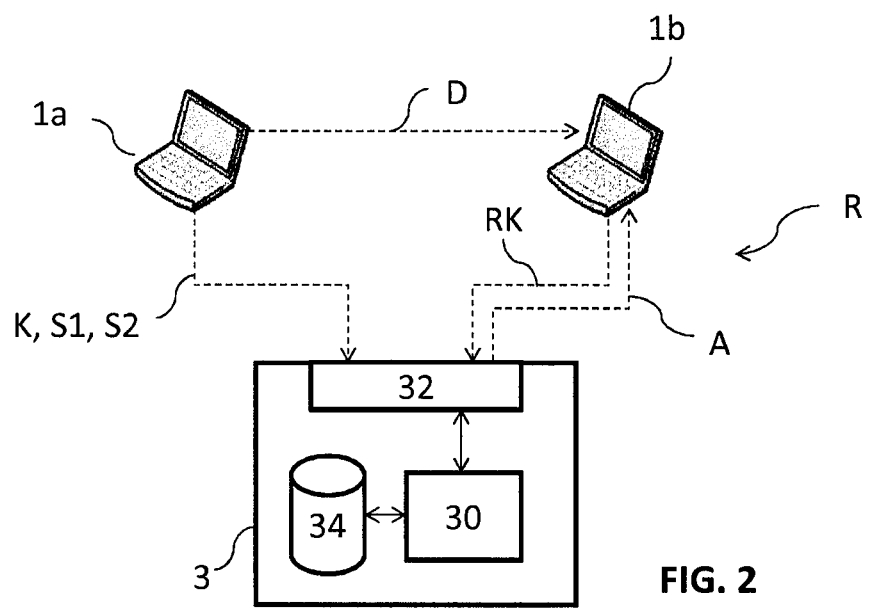
FIG. 2 illustrates a network comprising two terminals according to FIG. 1 and a control server.

In reference to FIG. 2, a network R comprises a first terminal 1a and a second terminal 1b, both complying with the above description in relation to FIG. 1.

The network R also comprises a server 3 for controlling decryption rights.

Exchanges of data between terminal 1A, terminal 1B, and the control server 3 are shown in dotted lines in FIG. 2. These different data are exchanged during the execution of a communication method, the steps of which will be described below.

The server 3 comprises a control unit 30, a network interface 32, and an internal memory 34.

The network interface 32 is adapted to communicate with the respective network interfaces 2 of the terminals 1a and 1b.

The processing unit 30 is connected to the network interface 32 and to the memory 34. More precisely the processing unit 30 has reading and writing access to the memory 34.

The memory 34 is adapted to store a database linking different types of data.

A communication method executed by the terminal 1a, the terminal 1b, and the server 3 will now be described.

This is from a transmission context of useful data from terminal 1a to terminal 1b.

Figure 3:
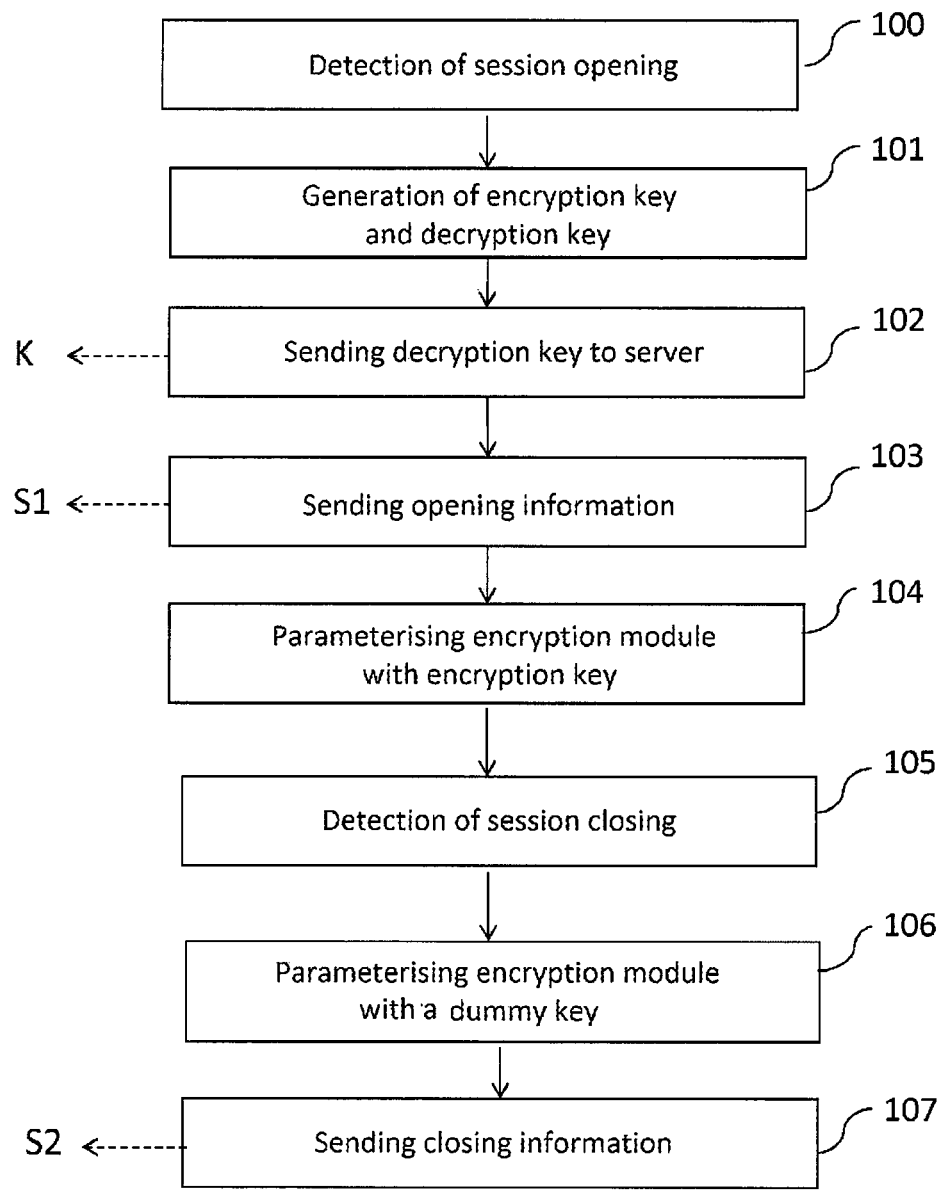
FIGS. 3 and 4 are organisational charts of steps of an encryption method according to an embodiment of the invention.

In reference to FIG. 3, the terminal 1a conducts the following steps.

The application program detects 100 an opening of an access session to the operating system by a user.

The session opening comprises typically:
displaying, on the display monitor 14, a connection page inviting a user to input a unique user identifier and/or a password associated with the identifier,
inputting, by a user, via the input means 12, a unique user identifier and/or a password associated with this identifier,
verifying by the operating system the input identifier and/or of the password,
as a function of the result of verification,
loading parameters of the operating system unique to the user (parameters defining programs to be run automatically, display parameters, etc.),
displaying a menu via which the user can access services of the operating system, access his private data, etc.

Detection 100 of session opening comprises for example a subscription of the application program to a signal generated by the operating system in response to such session opening.

After such detection 100, the terminal 1 generates 101 a pair of asymmetrical keys. The pair of keys comprises an encryption key, and a decryption key K corresponding to this encryption key. In other terms, the decryption key K is adapted to decrypt data encrypted by means of the encryption key.

The two keys generated are unique to the user who has opened the access session to the operating system.

The two keys can be generated for example by the encryption module 20 of the network card and can then be stored in the internal memory 22 of the network card 2, after transmission of a message generated by the application program for the encryption module 20, the message announcing that an access session has been opened by the user.

As a variant, the keys are generated directly by the operating system and stored in the memory 16.

The two keys can be generated at each new session opening of the user. In this case, they are temporary keys.

As a variant, the generation 101 of keys is undertaken during the first session opening by the user to access the operating system of the terminal 1a. During later session openings by the user, the keys are loaded from the memory 16 or else the memory 22.

The encryption key is intended to be known by the sole user.

The decryption key K is sent 102 to the control server 3. The decryption key K is intended to be used by third parties. However, it is evident that the control server determines a limited list of third parties authorised to use the decryption key.

Information S1 representative of the opening of the access session to the operating system by the user, called opening information, is also generated by the application program (or else by the processing module 20).

The opening information S1 comprises for example a field positioned at an "open session" value and the MAC address of the terminal 1a.

The opening information S1 can also comprise a unique identifier of the user (for example the identifier input by the user to open the access session to the operating system, or else another identifier specific to the user), and/or a timestamp. The timestamp is representative of the instant when the session opening was detected.

The opening information is sent 103 by the terminal 1a to the control server 3.

The application program detects 105 a closing of the session opened by the user. This detection can function in the same way as the opening detection step 100. In practice, the closing can be performed when the user clicks on a disconnection button displayed on the menu of the operating system via the monitor 14.

In response to the detection of closing 105, the application program configures the encryption module with a dummy key which is not unique to any user of the operating system. The dummy key can for example be generated randomly or be a key whereof the value cannot be allocated to a user ("zero" value, etc.).

It is assumed here that the dummy key is selected such that it introduces a loss of information during its use by the encryption module. In other terms, the data sent by the encryption module parameterised with the dummy key are not as such encrypted data, but indecipherable noise.

Even when a user is disconnected from the operating system, it can be that the operating system controls the emission of data over the network R; the dummy key prevents these data sent "silently" outside connection from being encrypted with the private key of the user, and limits the possibilities of attacks aimed at determining such an encryption key, by interception and analysis of encrypted data sent to the network.

Information S2 indicative of the closing of the session opened by the user, called closing information, is generated by the application program or else the processing module 20.

The closing information S2 comprises for example a field of the same type as that of the opening information S1, but positioned at a value "closed session" and the MAC address of the terminal 1a.

The closing information S2 can also comprise the unique identifier of the user contained in the opening information S1 previously sent to the server 2, and/or a timestamp. The timestamp is representative of the instant when the session closing was detected.

The terminal 1a sends 106 the closing information S2 to the control server 3.

The sending step 102 of the decryption key K can be conducted any time after the generation 101 and prior to the detection of closing 103. The decryption key K and the opening information S1 can be sent in the same message, for example.

If the opening S1 and closing S2 information include no timestamp, they are sent immediately after the corresponding detections. In this case, the time lapsed between the session opening (respectively closing) and the instant when the server 3 receives the opening information (respectively closing) is substantially equal to the propagation time of the information from terminal 1a to the server 3.

As will be clear below, the opening and closing information and the decryption key are used by the control server 3 to determine if the user of the terminal 1b has the right to decrypt data sent by the terminal 1a.

The steps described hereinabove are taken by the application program and repeated each time a new opening of access session to the operating system is detected.

Figure 4:
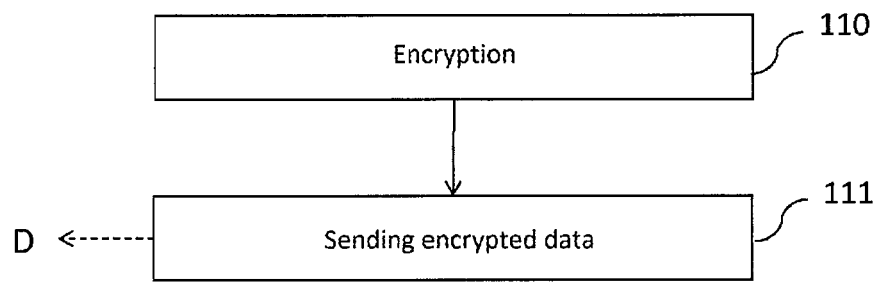

In reference to FIG. 4, the encryption module 20 conducts the following steps.

The encryption module encrypts useful data for the terminal 1b with the last encryption key with which it has been configured. After configuration step 104, this is the encryption key of the user of the terminal 1a.

The encryption step 110 produces encrypted data D by means of the encryption key.

The encrypted data D are sent 111 by the network card 2 of the terminal 1a over the network to the terminal 1B.

In the event where the encrypted data D are contained in a frame according to the standard IEEE 802 LAN, the MAC address of the receiving terminal 1b of useful data is contained in a header of the frame.

Figure 5:
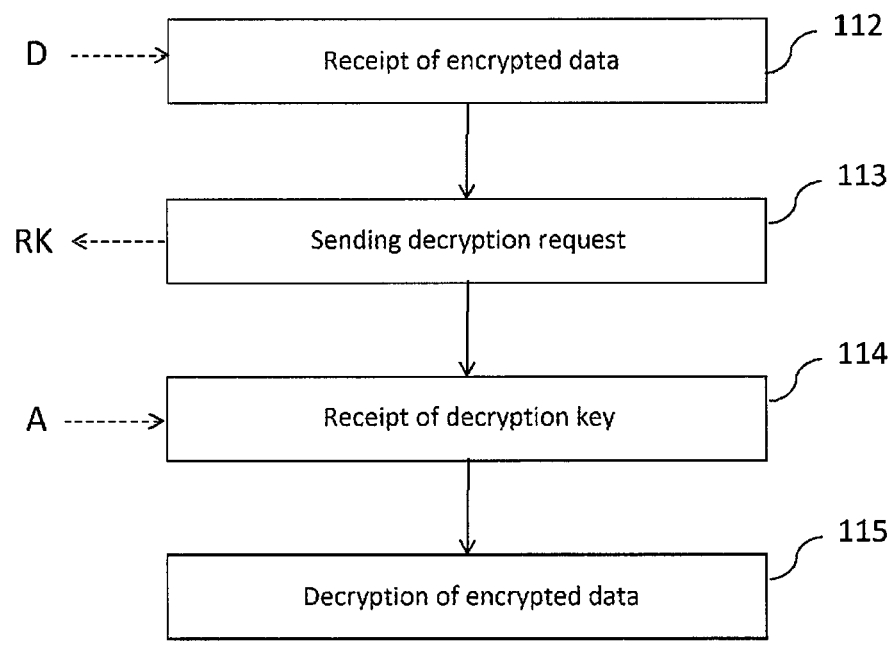
FIG. 5 is an organisational chart of steps of a decryption method according to an embodiment of the invention.

In reference to FIG. 5, the terminal 1b receiving encrypted data D conducts the following steps.

The terminal 1b receives 112 via its network interface 2 the encrypted data D sent by terminal 1a.

At this stage, it is considered that the terminal 1b does not know the decryption key K necessary for the decryption of data D.

After receipt 112 of encrypted data D, the terminal 1B sends a decryption request RK for the control server 3.

The function of the request RK is to ask this server 3 for the decryption key K necessary for decryption of encrypted data D. The decryption request comprises for example the MAC address of the terminal 1a (extracted from the frame which the terminal 1b received during the step 112), and the MAC address of terminal 1b itself.

Figure 6:
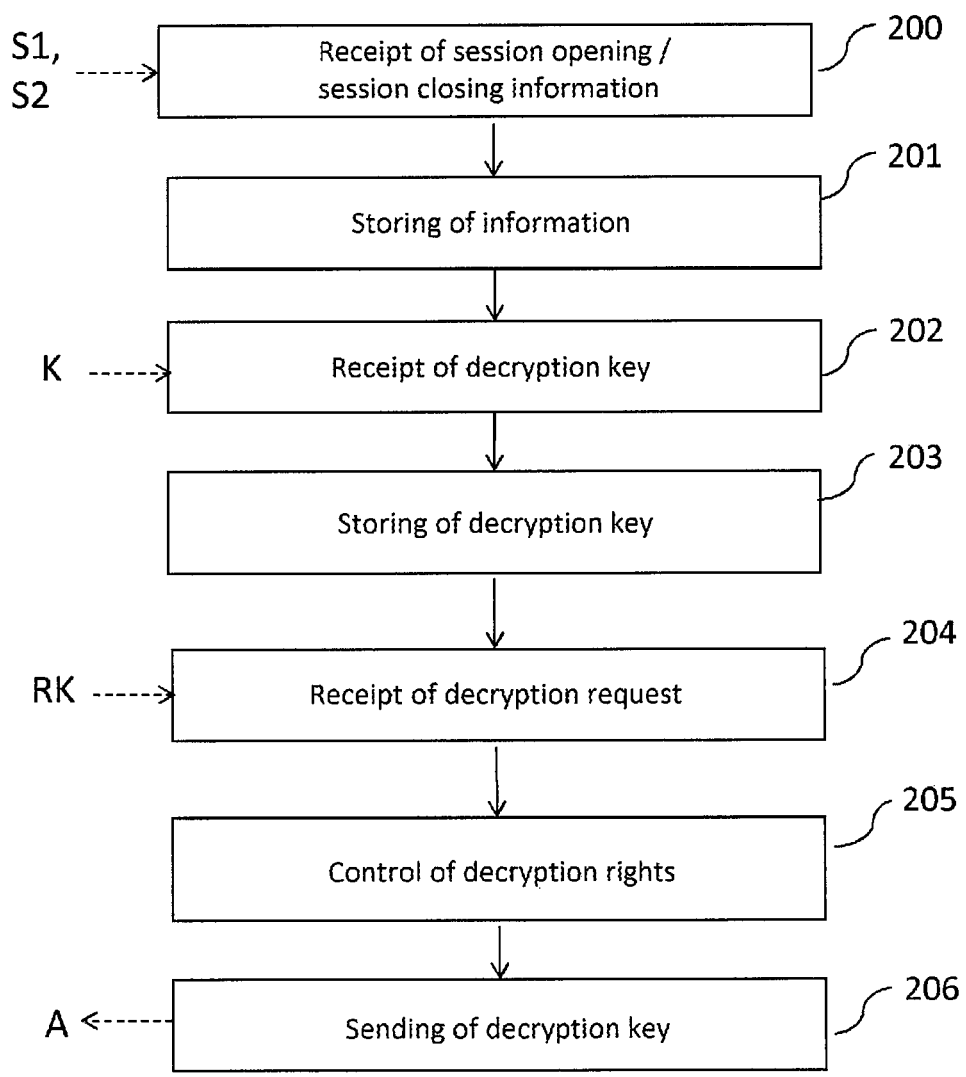
FIG. 6 is an organisational chart of steps of a method for controlling decryption rights according to an embodiment of the invention.

In reference to FIG. 6, the server 3 conducts the following steps.

The network interface 32 receives 200 the opening S1 and closing S2 information sent by the terminal 1a during the steps 103, 107 described previously in relation to FIG. 3, and sends this information S1, S2 to the processing unit 30.

The processing unit 30 controls storing 201 of information S1 and S2 in the memory 34 of the server 3.

The network interface 32 also receives 202 the decryption key K sent by the terminal 1a during the step 102 described previously in relation to FIG. 3, and sends this information S1, S2 to the processing unit 30.

The processing unit 30 controls storing 201 of the decryption key in the memory 34 of the server 3.

The network interface 32 receives 204 the decryption request RK sent by the terminal 1b during the step 113 described previously in relation to FIG. 4, and sends this information S1, S2 to the processing unit 30.

The receipt of the request RK triggers a control 205 of decryption rights executed by the control unit 20.

The function of the control step 205 is to determine:
the pertinent decryption key to decrypt the data D is available (the decryption key K),
whether the sending terminal 1b of the request RK of this pertinent decryption key is authorised to use the key K.

The control unit searches in the memory 34 for a decryption key originating from a terminal whereof the MAC address corresponds to the MAC address of the sending terminal of the request RQ. In the example considered, the preferred key L is the encryption key K and is present in the memory 34.

Several control strategies are possible.

A first strategy, relatively simple, is based on examining MAC addresses.

According to this first strategy, authorisation rules linking a source MAC address and a receiving MAC address are stored in the memory 34.

The control unit searches for a rule linking the MAC address of the terminal 1a and the MAC address of the terminal 1b in the memory 34.

If such a rule is found, the terminal 1b is authorised to use the decryption key K. In this case, the decryption key K is sent by the server 3 to the terminal 1b in a response message A If such a rule is not found, the terminal 1b is not authorised to use the decryption key K and the decryption key K is not sent. In this case, a response message A can be sent all the same with an error message.

A second strategy is based on the cross-examination of MAC addresses and users.

According to this second strategy, authorisation rules associating a source user identifier are stored in the memory 34 (included in the messages S1, S2) and a receiving user identifier (included in the request RK).

The control unit searches for a rule associating the user of the terminal 1a for whom the decryption key K has been generated, and the user of the terminal 1b.

If such a rule is found, the terminal 1b is authorised to use the decryption key K. In this case, the decryption key K is sent 206 by the server 3 to the terminal 1b in a response message A.

If such a rule is not found, the terminal 1b is not authorised to use the decryption key K and the decryption key K is not sent. In this case, an error message can all the same be sent to the terminal 1b.

Referring back to FIG. 5, the application program of the terminal 1b receives 114 the decryption key K.

The application program of the terminal 1b configures its decryption module 20 with the decryption key K.

The decryption module 20 decrypts the data D encrypted by means of the decryption key K received from the control server 3.

The decryption key K can be stored by the terminal K so it can be used to decrypt data originating from the terminal 1a identified by its MAC address.

Of course, the invention can form the object of variants other than those mentioned previously.

The encryption/decryption module 20 can be a software module integrated into the operating system of the terminal 1, and not a module relocated to a network card.

The method described can apply to other types of frames than those of IEEE 802 LAN type.

The invention claimed is:

1. An encryption method executed by a first terminal comprising an operating system accessible by several users and a data encryption module for encrypting data to be sent to a second terminal, the method comprising steps of:
   detecting opening an access to an operating system of a first terminal by a user, wherein the operating system of the first terminal is accessible by each of said several users,
   in response to the detection of said opening, setting an encryption module of the first terminal with an encryption key unique to the user to encrypt data to be sent to the second terminal,
   wherein the encryption key is generated by the first terminal, or is stored in a memory of the first terminal prior to said detecting opening of access,
      sending, by the first terminal to a remote control server through a communication network, of information indicating that an access to the operating system was opened or closed by the user, the remote control server being adapted to control the use of a decryption key by the second terminal as a function of a last indicative information sent, wherein the last indicative information sent indicates that said access to the operating system was opened or closed by the user, wherein the decryption key is adapted to decrypt data encrypted by means of the encryption key.

2. The method as claimed in claim 1, also comprising the steps of:
   detecting closing of the access to the operating system by the user, setting the encryption module by means of a dummy key in response to the detection of closing.

3. The method as claimed in claim 1, in which the detecting comprises a subscribing to a signal defined by the operating system, the signal being representative of an opening or closing of access to the operating system, and catching the signal.

4. The method as claimed in claim 3, in which the subscription is performed by an application program which also controls the setting step of the encryption module.

5. The method as claimed in claim 1, the steps of which are performed for a session of current access to the operating system by the user and following access to the operating system by the user, and in which the encryption key with which the encryption module is set during subsequent access is different to the encryption key with which the encryption module is set during the current access.

6. The method as claimed in claim 1, also comprising:
   generating or loading from a memory of the terminal the decryption key sending of the decryption key to the remote control server.

7. The method as claimed in claim 1, in which each key is generated by the encryption module.

8. The method as claimed in claim 1, in which the encryption module is integrated into a network card independent of the operating system.

9. The method as claimed in claim 1, in which the encryption module encrypts payload data of frames according to the standard IEEE 802 LAN by means of the encryption key.

10. The method as claimed in claim 1, in which the encryption module is configured to encrypt any datum intended to be sent over a network by a network card of the first terminal.

11. A non-transitory computer-readable medium for a terminal comprising an operating system accessible by several users and a data encryption module for encrypting data to be sent to another terminal, wherein code instructions for carrying out an encryption method are encoded on the computer-readable medium, wherein the encryption method comprises:
   detecting opening an access to an operating system of a first terminal by a user, wherein the operating system of the first terminal is accessible by each of said several users,
   in response to the detection of opening, setting an encryption module of the first terminal with an encryption key unique to the user to encrypt data to be sent to a second terminal, wherein the encryption key is generated by the first terminal, or is stored in a memory of the terminal prior to said detecting opening of access,
   sending, by the first terminal to a remote control server through a communication network, of information indicating that an access to the operating system was opened or closed by the user, wherein the remote control server is adapted to control the use of a decryption key by the second terminal as a function of a last indicative information sent, wherein the last indicative information sent indicates that said access to the operating system was opened or closed by the user and wherein the decryption key is adapted to decrypt data encrypted by means of the encryption key.

12. An encryption kit comprising:
   an encryption module adapted to encrypt data by means of a key, and
   a non-transitory computer-readable medium, adapted to configure the key used by the encryption module, comprising
   an operating system accessible by several users, wherein code instructions for carrying out an encryption method are encoded on the computer-readable medium, wherein the encryption method comprises:
   detecting opening an access to the operating system of a first terminal by a user, in response to the detection of opening, setting the encryption module with an encryption key unique to the user to encrypt data to be sent to a second terminal, wherein the encryption key is generated by the first terminal, or is stored in a memory of the terminal prior to said detecting opening of access,
   sending, by the first terminal to a remote control server through a communication network, of information indicating that an access to the operating system was opened or closed by the user, wherein the remote control server is adapted to control the use of a decryption key by the second terminal as a function of a last indicative information sent, wherein the last indicative information sent indicates that said access to the operating system was opened or closed by the use and wherein the decryption key is adapted to decrypt data encrypted by means of the encryption key.

13. The encryption kit as claimed in claim 12, comprising a network card, the network card integrating the encryption module.

14. A method for controlling decryption rights of data comprising the following steps conducted by a control server:
   at a control server, receiving a decryption key adapted to decrypt encrypted data by means of an encryption key unique to a user, at the control server, receiving information from a remote first terminal indicating an opening and/or closing of access by the user to an operating system of the remote first terminal, wherein the control server communicates with the remote first terminal through a communication network, at the control server, receiving a request sent by a remote second terminal, the request asking for a decryption key to decrypt encrypted data originating from the remote first terminal, wherein the control server communicates with the remote second terminal through the communication network, at the control server, sending the decryption key to the remote second terminal in response to the request, as a function of a most recent information received from the remote first terminal, wherein the most recent information indicates that an access to the operating system was opened or closed by the user.

15. The method as claimed in claim 14, in which:
the decryption key is sent to the remote second terminal if the most recent information received indicates an opening of access by the user,
the decryption key is not sent to the remote second terminal if the most recent information received indicates a closing of access by the user.

16. The method as claimed in any one of claims 13 to 14, also comprising receiving an address identifying the remote first terminal, receiving an address identifying the second terminal, in which the decryption key is sent to the remote second terminal as a function of the two addresses.

17. The method as claimed in any one of claims 13 to 15, also comprising receiving an identifier of the user of the remote first terminal, receiving an identifier of a user of the remote second terminal, in which the decryption key is sent to the remote second terminal as a function of the two identifiers.

* * * * *